United States Patent
Lin et al.

(10) Patent No.: US 10,432,000 B2
(45) Date of Patent: Oct. 1, 2019

(54) PORTABLE CHARGER HAVING SWITCH FOR ADJUSTING VOLTAGE THEREOF

(71) Applicant: APO INTERNATIONAL CO., LTD., Taipei (TW)

(72) Inventors: Ting-Ping Lin, Taipei (TW); Ker-Wen Teng, Taipei (TW); Kuo-Pin Wen, Taipei (TW); Hsiang-Ming Chen, Taipei (TW)

(73) Assignee: APO INTERNATIONAL CO., LTD., Taipei (TW)

( * ) Notice: Subject to any disclaimer, the term of this patent is extended or adjusted under 35 U.S.C. 154(b) by 135 days.

(21) Appl. No.: 15/880,322

(22) Filed: Jan. 25, 2018

(65) Prior Publication Data

US 2019/0157884 A1    May 23, 2019

(30) Foreign Application Priority Data

Nov. 22, 2017 (TW) ............................ 106217339 U (51) Int. Cl.
*H02J 7/00* (2006.01)
*H01M 2/10* (2006.01)
*H01R 31/06* (2006.01)
*H01M 6/44* (2006.01)

(52) U.S. Cl.
CPC ......... *H02J 7/0042* (2013.01); *H01M 2/1016* (2013.01); *H02J 7/0004* (2013.01); *H02J 7/0055* (2013.01); *H02J 7/0065* (2013.01); *H01M 6/44* (2013.01); *H01R 31/065* (2013.01); *H02J 7/0068* (2013.01); *H02J 2007/0062* (2013.01); *H02J 2007/0096* (2013.01)

(58) Field of Classification Search
CPC ....... Y02E 60/12; H02J 7/0042; H02J 7/0045; H02J 7/0004; H02J 7/0055; H02J 7/0068; H02J 2007/0062; H02J 2007/0096; H01M 10/44; H01M 10/46; H01M 2/1016; H01M 6/44; H01R 31/065
USPC .................................. 320/107, 134; 307/150
See application file for complete search history.

(56) References Cited

U.S. PATENT DOCUMENTS

2007/0126290 A1\* 6/2007 Jaynes .................. H02J 7/0044
                                                                307/150
2016/0277879 A1\* 9/2016 Daoura ................. H04W 4/029

\* cited by examiner

*Primary Examiner* — Richard Isla
*Assistant Examiner* — Mohammed J Sharief
(74) *Attorney, Agent, or Firm* — Maschoff Brennan (57) ABSTRACT

The disclosure provides a portable charger including a power supply and an adapter. The power supply includes a battery module, a first terminal set, a voltage control module and a first switch portion. The battery module has an initial voltage. The adapter includes a second casing, a second terminal set, an output connector and a second switch portion. When the adapter is detached from the power supply, the portable charger is in a first state, and the voltage control module adjusts the initial voltage to a first voltage, allowing the first terminal set to output the first voltage; when the adapter is disposed on the power supply, the portable charger is in a second state, and the voltage control module adjusts the initial voltage to a second voltage which is different from the first voltage, allowing the first terminal set to output the second voltage.

12 Claims, 8 Drawing Sheets

PORTABLE CHARGER HAVING SWITCH FOR ADJUSTING VOLTAGE THEREOF

CROSS-REFERENCE TO RELATED APPLICATIONS

This non-provisional application claims priority under 35 U.S.C. § 119(a) on Patent Application No(s). 106217339 filed in Taiwan, R.O.C. on Nov. 22, 2017, the entire contents of which are hereby incorporated by reference.

TECHNICAL FIELD

The disclosure relates to a charger, more particularly to a portable charger.

BACKGROUND

With the development of technology, portable electronic devices, such as mobile phones, tablets or notebooks, are widely used in daily life. Portable charger, is a device to extend the portable electronic device's uptime. Generally, a portable charger consists of a rechargeable battery and a voltage adapter, and the rechargeable can provide electricity to the portable electronic device by connecting it to the portable electronic device through a wire.

However, the output voltage of conventional portable chargers is only exclusive to some portable electronic devices, so the applicability of the conventional portable chargers is restricted.

SUMMARY

The present disclosure provides a portable charger having a higher applicability.

One embodiment of the disclosure provides a portable charger including a power supply and an adapter. The power supply includes a first casing, a battery module, a first terminal set, a voltage control module and a first switch portion. The battery module, the first terminal set, the voltage control module and the first switch portion are disposed in the first casing, and the battery module, the first terminal set and the first switch portion are electrically connected to the voltage control module. The adapter includes a second casing, a second terminal set, an output connector and a second switch portion. The second terminal set, the output connector and the second switch portion are disposed in the second casing, the second terminal set are electrically connected to the output connector, the second casing is detachably disposed on the first casing, and the second switch portion and the first switch portion are configured to switch control mode of the voltage control module. The battery module has a rated voltage; when the second casing of the adapter is detached from the first casing of the power supply, and the first switch portion is not activated by the second switch portion, the portable charger is in a first state, and the voltage control module adjusts the rated voltage to a first voltage, allowing the first terminal set to output the first voltage; when the second casing of the adapter is disposed on the first casing of the power supply, the first switch portion is activated by the second switch portion, the portable charger is in a second state, and the voltage control module adjusts the rated voltage to a second voltage which is different from the first voltage, allowing the first terminal set to output the second voltage.

One embodiment of the disclosure provides a portable charger including a power supply and an adapter. The power

2 supply includes a first casing, a battery module, a first connector and a voltage control module. The battery module, the first connector and the voltage control module are disposed in the first casing, the battery module and the first connector are electrically connected to the voltage control module, and the first connector is electrically connected to one of a positive pole and a negative pole of the battery module. The adapter includes a second casing, a second connector and an output connector, the second connector and the output connector are disposed in the second casing, the second connector is electrically connected to the output connector, the second casing is detachably disposed on the first casing, the second connector is pluggable into the first connector in order to switch control mode of the voltage control module. The battery module has a rated voltage; when the first connector is electrically disconnected from the second connector, the portable charger is in a first state, and the voltage control module adjusts the rated voltage to a first voltage, allowing the first connector to output the first voltage; when the first connector is electrically connected to the second connector, the portable charger is in a second state, and the voltage control module adjusts the rated voltage to a second voltage which is different from the first voltage, allowing the first connector to output the second voltage.

According to the portable charger as discussed above, by detaching the adapter from the power supply or disposing the adapter on the power supply, the portable charger is able to switch to the first state or the second state to provide different output voltages. As a result, the portable charger is applicable to electronic devices having different voltage requirements.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
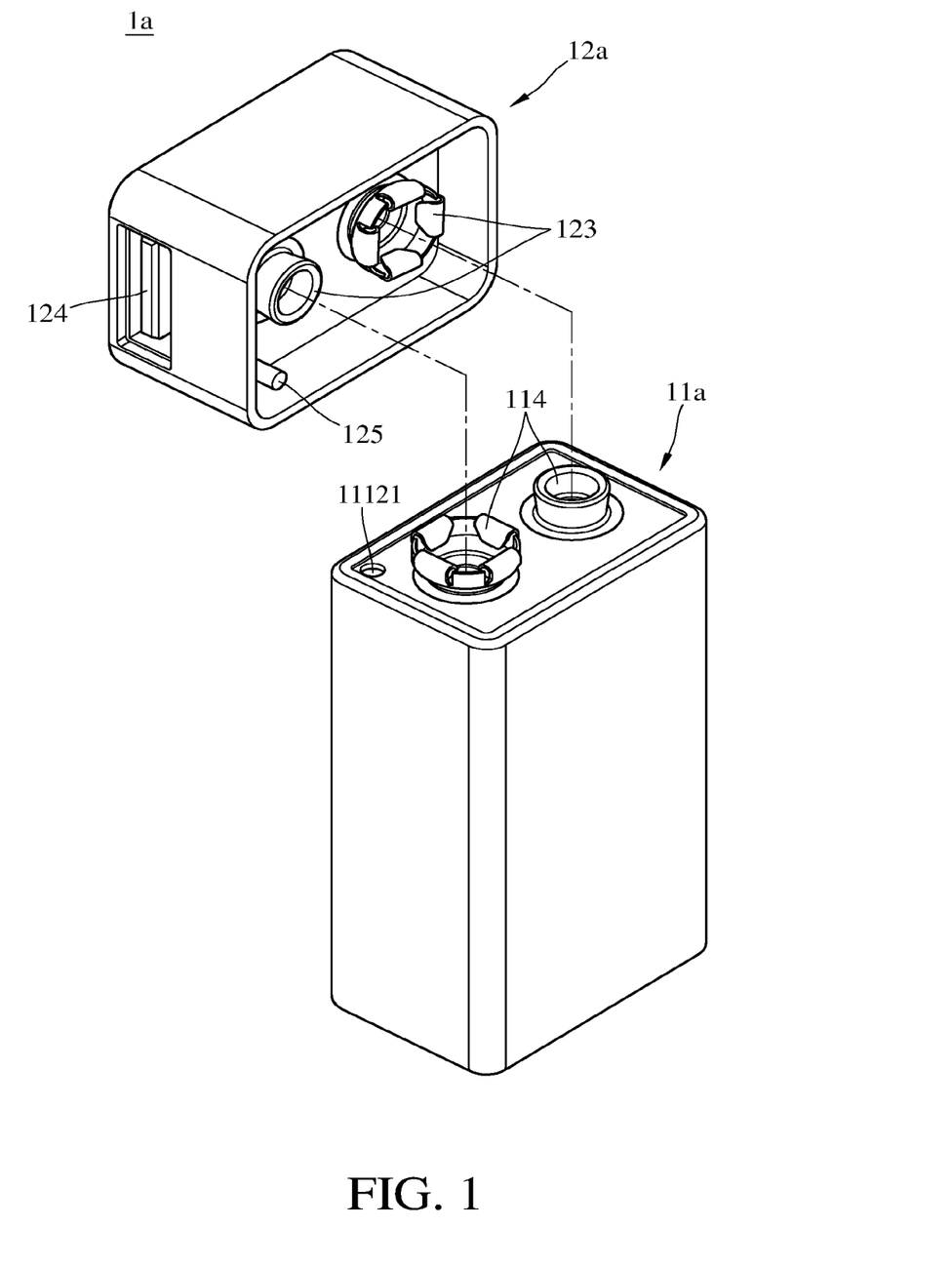
FIG. 1 is an exploded view of a portable charger according to a first embodiment of the present disclosure.
Figure 2:
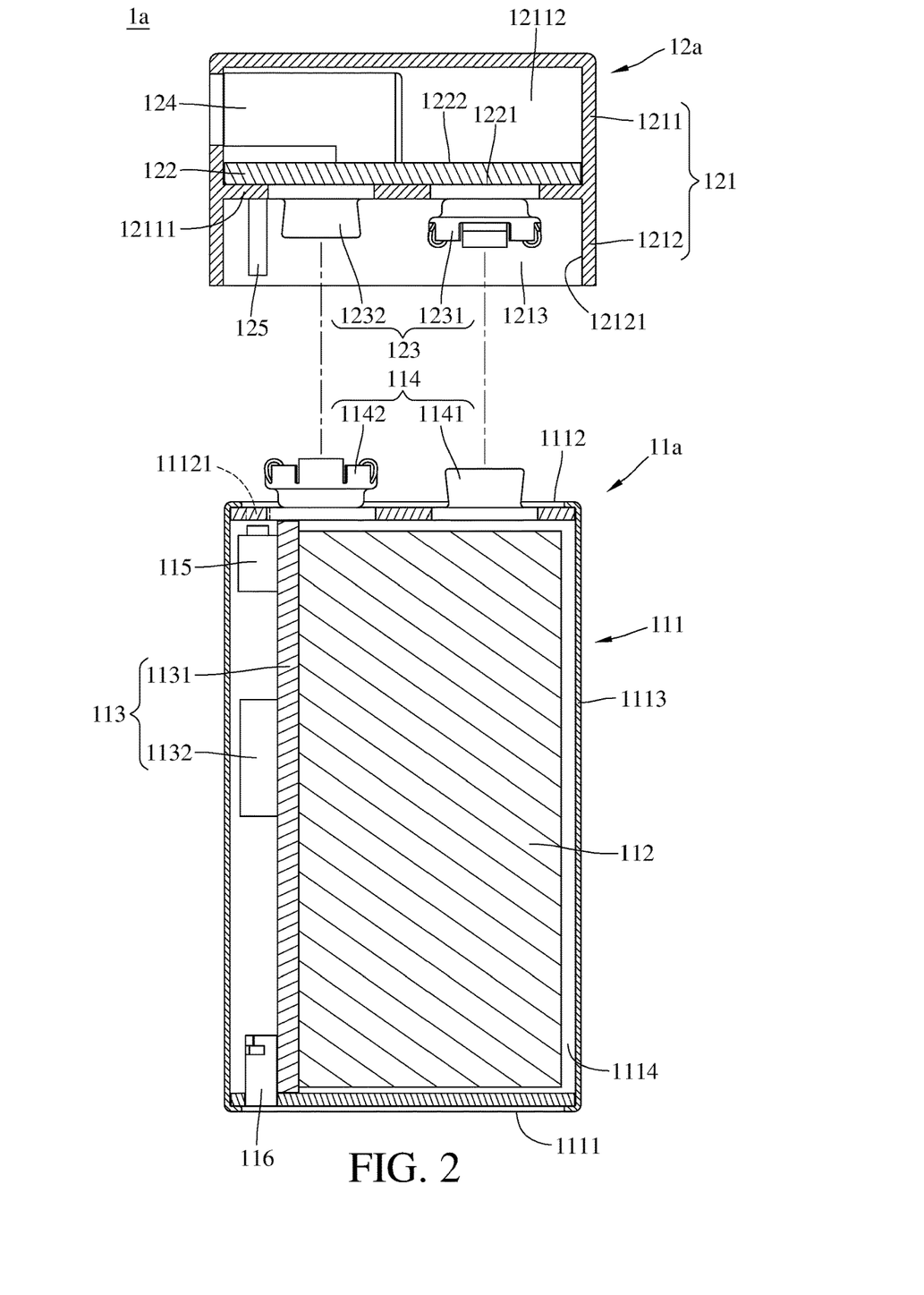
FIG. 2 is a cross-sectional view of the portable charger in FIG. 1.
Figure 3:
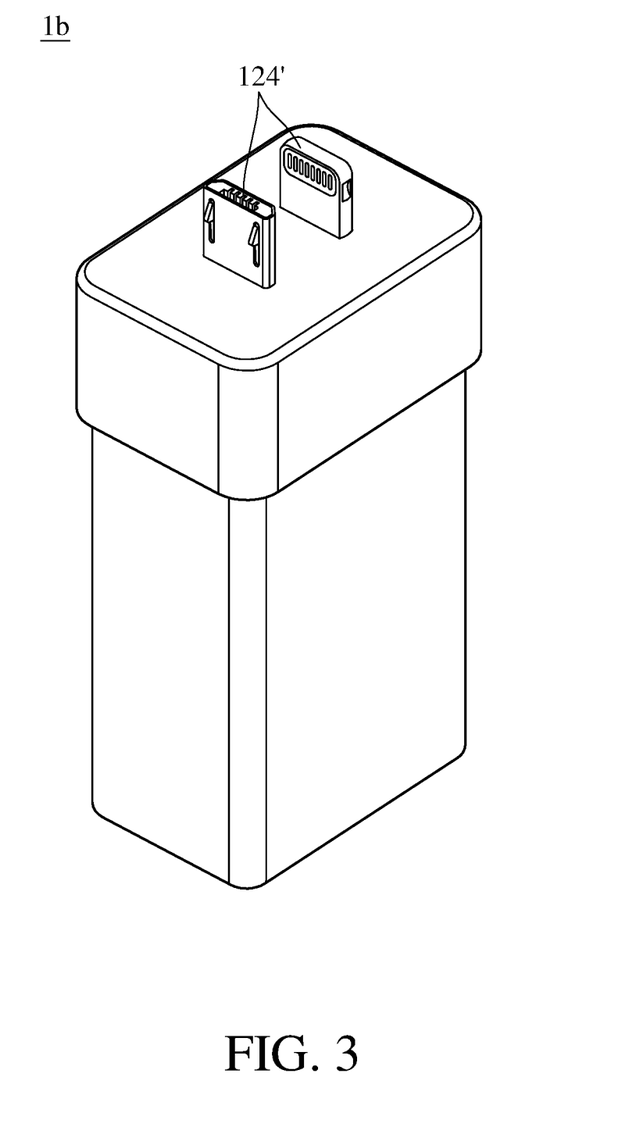
FIG. 3 is a perspective view of a portable charger according to a second embodiment of the present disclosure.
Figure 4:
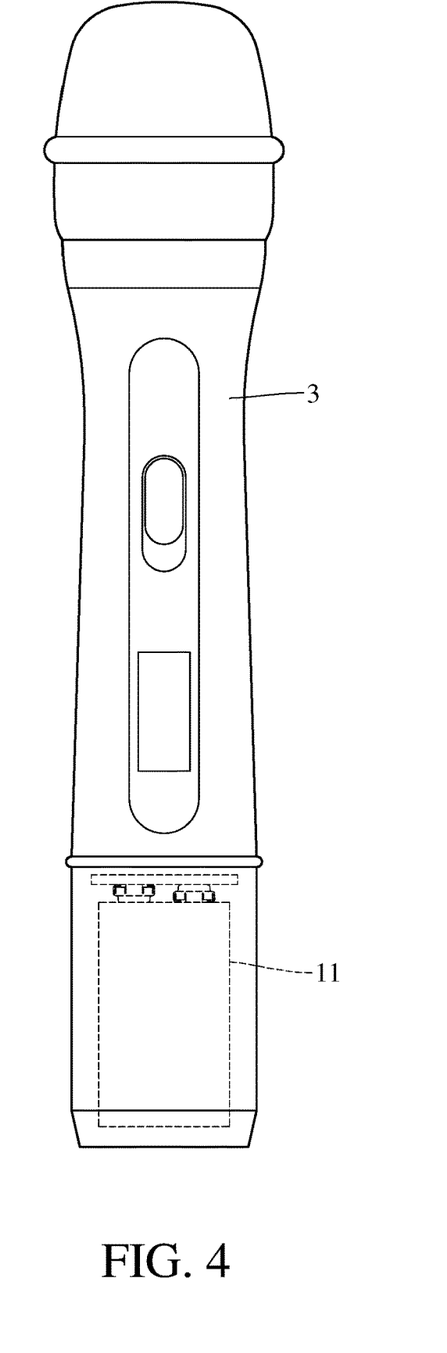
FIG. 4 is a view of the portable charger in FIG. 1 when it is in a first state.
Figure 5:
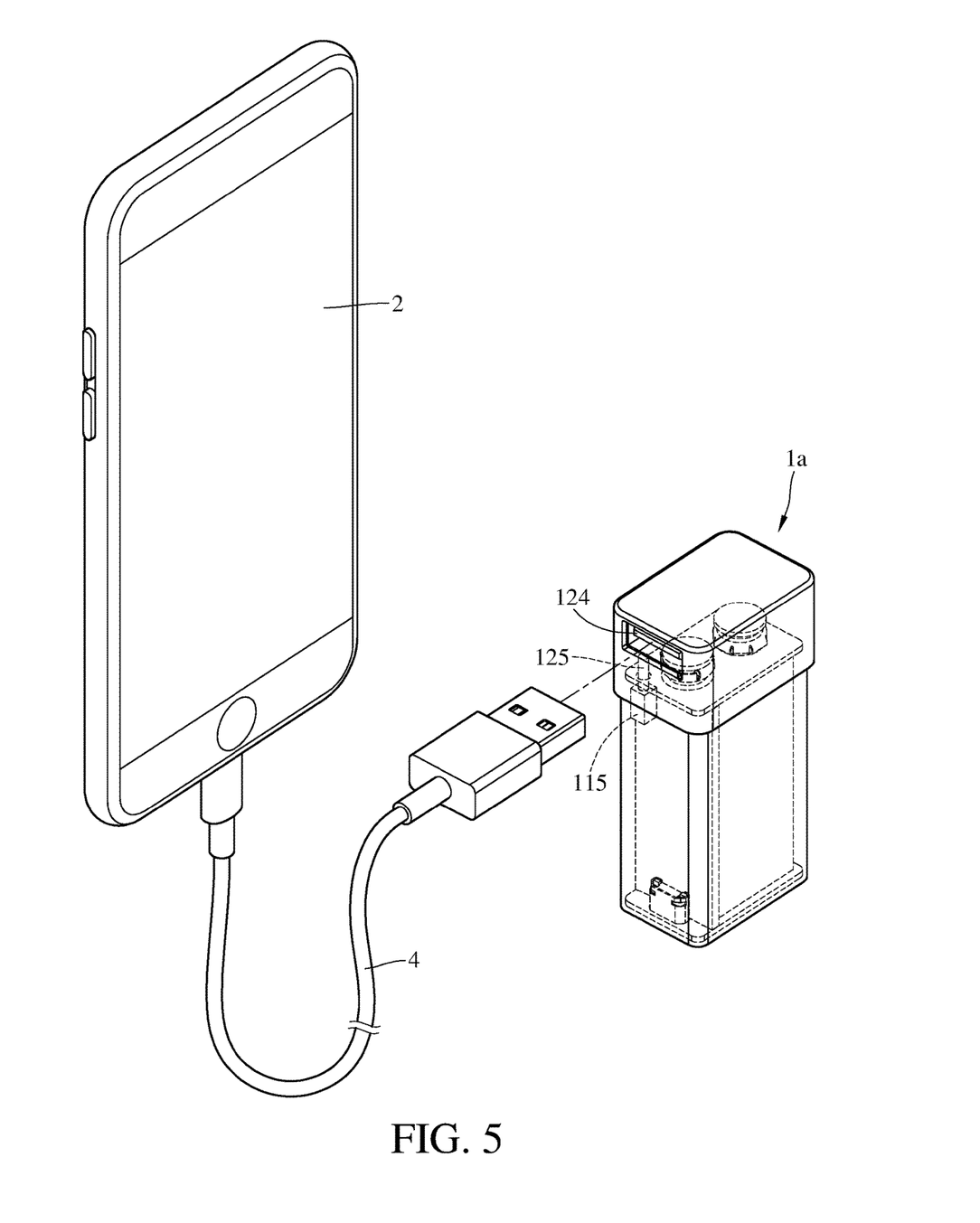
FIG. 5 is a view of the portable charger in FIG. 1 when it is in a second state.

Please refer to FIGS. 1 to 5. FIG. 1 is an exploded view of a portable charger according to a first embodiment of the present disclosure. FIG. 2 is a cross-sectional view of the portable charger in FIG. 1. FIG. 3 is a perspective view of a portable charger according to a second embodiment of the present disclosure. FIG. 4 is a view of the portable charger in FIG. 1 when it is in a first state. FIG. 5 is a view of the portable charger in FIG. 1 when it is in a second state.

This embodiment provides a portable charger 1a. The portable charger 1a includes a power supply 11a and an adapter 12a.

The power supply 11a is, for example, a 9-volt battery. The power supply 11a includes a first casing 111, a battery module 112, a voltage control module 113, a first terminal set 114, a first switch portion 115 and a charge port 116.

The first casing 111 includes a bottom plate 1111, a top plate 1112 and a side wall 1113. The bottom plate 1111 and the top plate 1112 are respectively connected to two opposite sides of the side wall 1113, and the bottom plate 1111, the top plate 1112 and the side wall 1113 together form a first chamber 1114. The top plate 1112 has a through hole 11121 connected to the first chamber 1114.

The battery module 112 is, for example, a rechargeable battery (also called storage battery, or secondary cell). The battery module 112 is disposed in the first chamber 1114. Specifically, the battery module 112 is, for example, a lithium-ion battery, but the type of the battery module 112 is not restricted. In some other embodiments, the battery module may be a nickel-cadmium battery, a nickel metal hydride battery, or a lithium-polymer battery. In addition, in this embodiment, the battery module 112 has an initial voltage of 3.7 V, but the present disclosure is not limited thereto. In some other embodiments, the initial voltage of the battery module may be changed according to actual requirements.

The voltage control module 113 is disposed in the first chamber 1114 of the first casing 111. The voltage control module 113 includes a first circuit board 1131 and a voltage converter 1132. The voltage converter 1132 is disposed on the first circuit board 1131. In this embodiment, the first circuit board 1131 is vertically disposed on the bottom plate 1111 and located on a side of the battery module 112, but the present disclosure is not limited thereto. In some other embodiments, the first circuit board may be horizontally disposed on the bottom plate and located on the top or the bottom of the battery module.

The battery module 112 is electrically connected to the first circuit board 1131 of the voltage control module 113. The voltage converter 1132 is configured to convert the voltage of the battery module 112.

The first terminal set 114 is disposed on the top plate 1112 of the first casing 111. The first terminal set 114 includes a first terminal 1141 and a second terminal 1142. The first terminal 1141 and the second terminal 1142 protrude from a same side of the top plate 1112. The first terminal 1141 is, for example, a positive terminal. The second terminal 1142 is, for example, a negative terminal.

The first switch portion 115 is disposed on the first circuit board 1131 of the voltage control module 113 and corresponds to the through hole 11121. The voltage output from the first terminal set 114 is determined by whether the first switch portion 115 is activated or not, and it will be described in the following paragraphs.

The charge port 116 is disposed on the first circuit board 1131 of the voltage control module 113. The charge port 116 is electrically connected to the battery module 112 through the first circuit board 1131. The charge port 116 is, for example, a USB type-C port or a Micro-USB port. The charge port 116 is exposed from the first casing 111. When the battery module 112 is running out, the power supply 11a can be connected to an external power source (not shown) via the charge port 116 to charge the battery module 112. However, the charge port 116 is optional. In some other embodiments, the power supply may charge the battery module through a wireless charging manner. In addition, in this or some other embodiments, the location of the charge port 116 on the power supply is not restricted, it can be changed according to actual requirements.

The adapter 12a includes a second casing 121, a second circuit board 122, a second terminal set 123, an output connector 124 and a second switch portion 125.

The second casing 121 is detachably disposed on the first casing 111 of the power supply 11a. The second casing 121 includes a base portion 1211 and a side wall 1212 that are connected to each other. The base portion 1211 has a bottom plate 12111 and a second chamber 12112. The bottom plate 12111 of the base portion 1211 and an inner surface 12121 of the side wall 1212 together form a receiving space 1213. When the adapter 12a is disposed on the power supply 11a, the power supply 11a is partially located in the receiving space 1213. That is, when the adapter 12a is disposed on the power supply 11a, a portion of the power supply 11a is located in the receiving space 1213 and covered by and the side wall 1212 of the second casing 121. It is understood that the side wall 1212 is able to position the adapter 12a with respect to the power supply 11a.

The second circuit board 122 is disposed in the second chamber 12112 of the base portion 1211. The second circuit board 122 has a first surface 1221 and a second surface 1222 that are opposite to each other. The first surface 1221 is attached to the bottom plate 12111.

The second terminal set 123 is disposed on the bottom plate 12111 of the base portion 1211. The second terminal set 123 includes a third terminal 1231 and a fourth terminal 1232. The third terminal 1231 and the fourth terminal 1232 are electrically connected to the second circuit board 122, protrude from the first surface 1221 of the second circuit board 122 and penetrate through the bottom plate 12111, and are located in the receiving space 1213. When the second casing 121 of the adapter 12a is disposed on the first casing 111 of the power supply 11a, the first terminal 1141 and the second terminal 1142 are respectively electrically connected to the third terminal 1231 and the fourth terminal 1232.

The output connector 124 is, for example, a USB port. The output connector 124 is disposed on the base portion 1211. The output connector 124 is electrically connected to the second circuit board 122 and electrically connected to the second terminal set 123 of the second circuit board 122. The output connector 124 is able to be connected to a portable electronic device 2 (e.g. a mobile phone) through an electrical transmission line (not shown).

In addition, it is noted that the present disclosure is not limited to the type of the output connector 124. In some other embodiments, the output connector may be replaced with a USB type-C plug or another type of USB plug; alternatively, as shown in FIG. 3, a portable charger 1b may have two output connectors 124', one is a lightning plug and the other is a micro-USB plug.

The second switch portion 125 protrudes from the bottom plate 12111 of the base portion 1211 and is located in the receiving space 1213. The first switch portion 115 on the power supply 11a is able to be activated by being pushed by the second switch portion 125 to switch the mode of the voltage control module 113.

In this embodiment, the first switch portion 115 is, for example, a push switch, and the second switch portion 125 is, for example, a protrusion.

In detail, when the adapter 12a is detached from (or, not disposed on) the power supply 11a, the first switch portion 115 of the power supply 11a is not pushed by the second switch portion 125 of the adapter 12a. In such a case, the first switch portion 115 is not activated so that the portable charger 1a is determined in a first state, and the voltage converter 1132 adjusts the initial voltage of the battery module 112 to a first voltage (e.g. 9V), allowing the first terminal set 114 to output the first voltage. That is, when the portable charger 1a is in the first state, the output voltage is 9V, plus the appearance of the power supply 11a is similar to a 9-Volt battery. Therefore, the power supply 11a can be taken as a 9-V battery. For example, as shown in FIG. 4, the power supply 11a is able to be plugged into a wireless microphone 3.

When the second casing 121 of the adapter 12a is disposed on the first casing 111 of the power supply 11a, the second switch portion 125 of the adapter 12a penetrates through the through hole 11121 to push the first switch portion 115 of the power supply 11a. In such a case, the first switch portion 115 is activated so that the portable charger 1a is determined in a second state, and the voltage converter 1132 adjusts the voltage of the battery module 112 to a second voltage (e.g. 5V), allowing the first terminal set 114 to output the second voltage. Accordingly, the output voltage of the portable charger 1a becomes 5V; accordingly, the portable charger 1a is adapted to charge the mobile phone 2. As shown in FIG. 5, the portable charger 1a is able to charge the mobile phone 2 by plugging the output connector 124 with an electrical transmission line 4 having a lightening plug or a USB type-C plug connected to the mobile phone 2.

Figure 6:
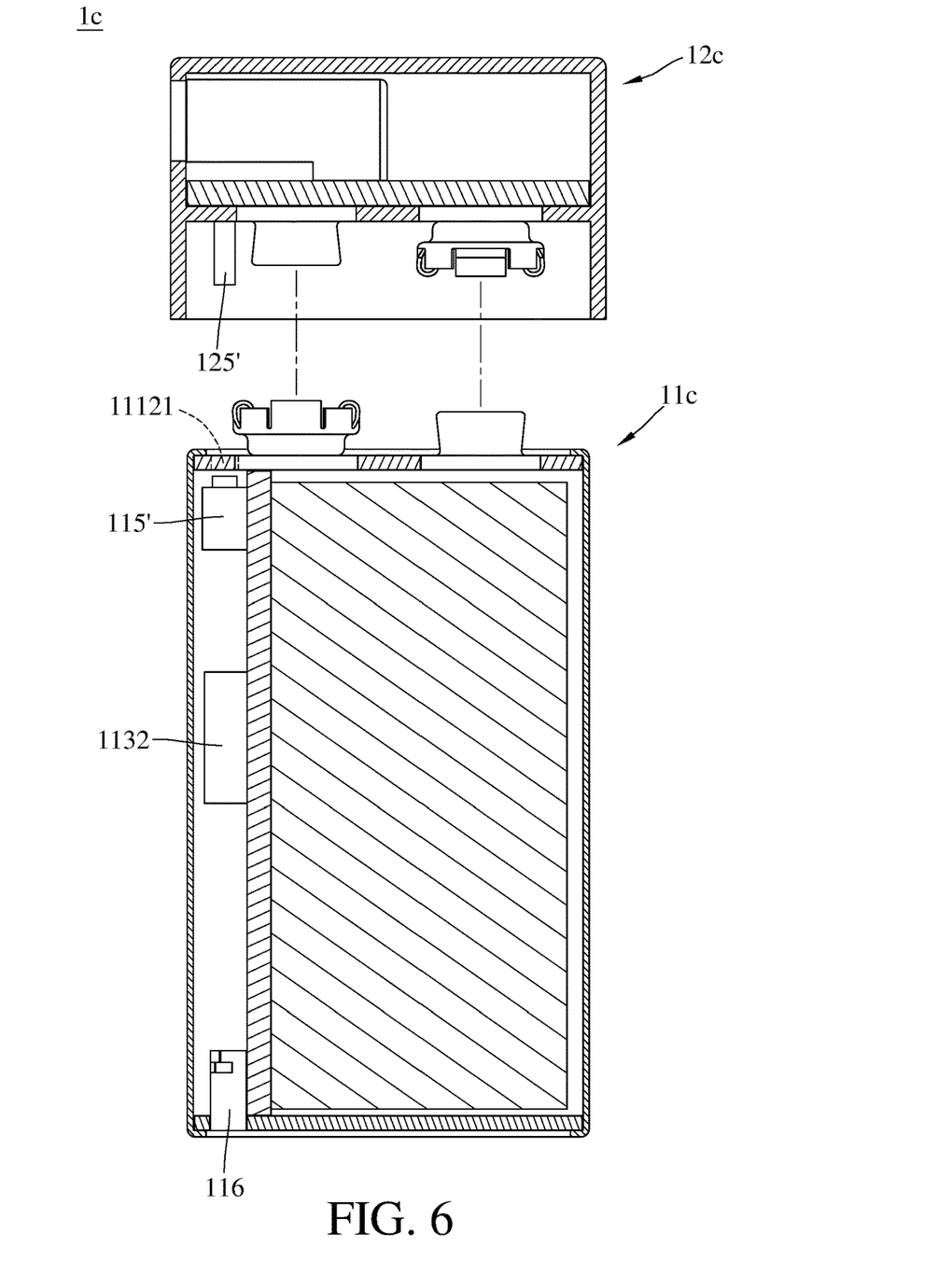
FIG. 6 is an exploded view of a portable charger according to a third embodiment of the present disclosure.

It is noted that the present disclosure is not limited to the configuration of the first switch portion 115 and the second switch portion 125. Please refer to FIG. 6, which is an exploded view of a portable charger according to a third embodiment of the present disclosure. This embodiment provides a portable charger 1c. The portable charger 1c has a first switch portion 115', which is a light emitter, and a second switch portion 125', which is a light receiver. When the adapter 12c is detached from the power supply 11c, light emitted from the light emitter 115' does not enter the light receiver 125', such that the portable charger 1c is determined in the first state; on the contrary, when the adapter 12c is disposed on the power supply 11c, the light receiver 125' receives the light emitted from the light emitter 115', such that the portable charger 1c is switched to the second state.

In addition, it is noted that the present disclosure is not limited to the type of the power supply 11a. In some other embodiments, the power supply may be an AA battery, an AAA battery, an AAAA battery, a C-Type battery or a D-Type battery, having electrical poles on opposite sides. Furthermore, the present disclosure is not limited to the value of the first voltage. In some other embodiments, the first voltage may be 1.5V.

Figure 7:
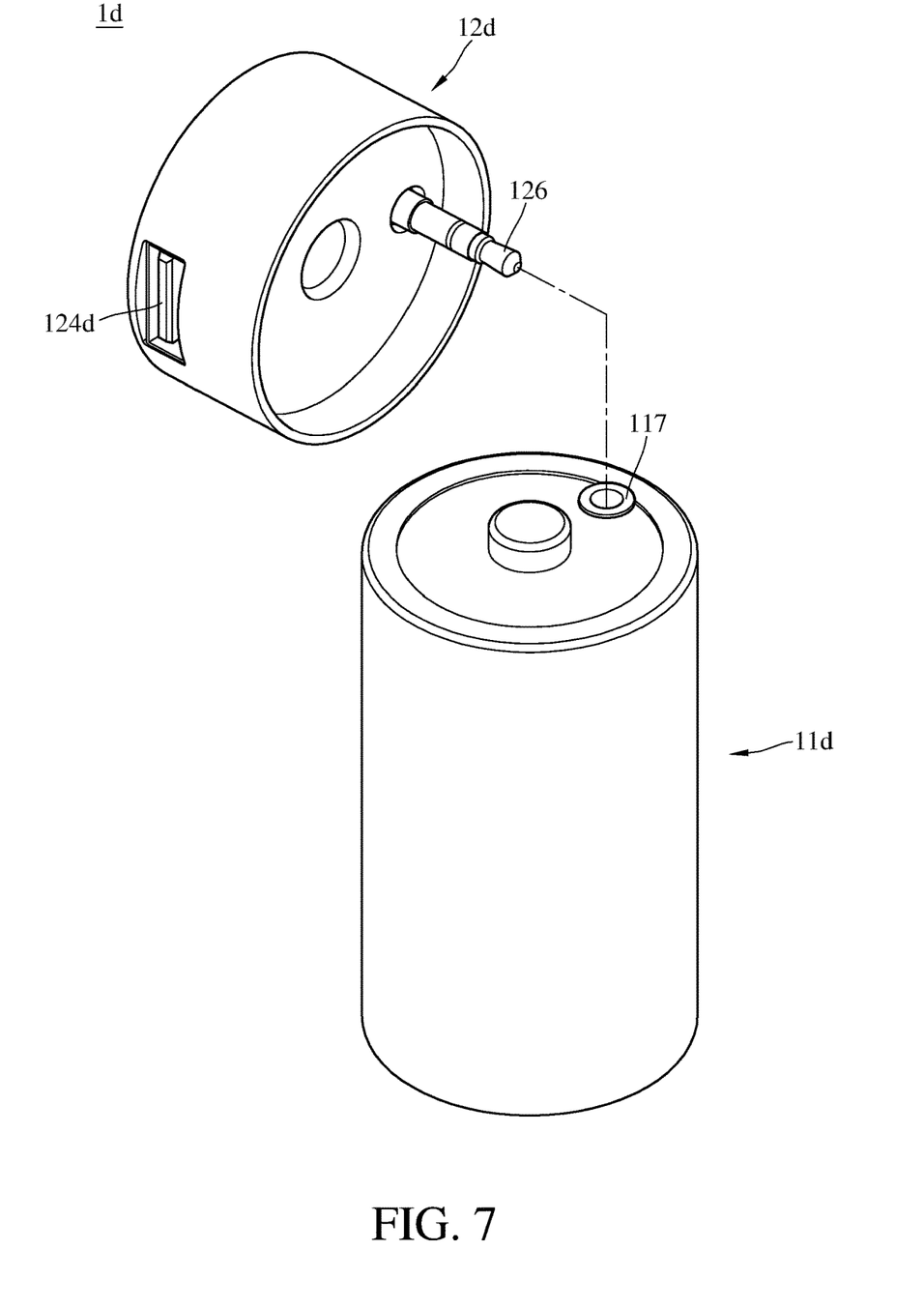
FIG. 7 is an exploded view of a portable charger according to a fourth embodiment of the present disclosure.
Figure 8:
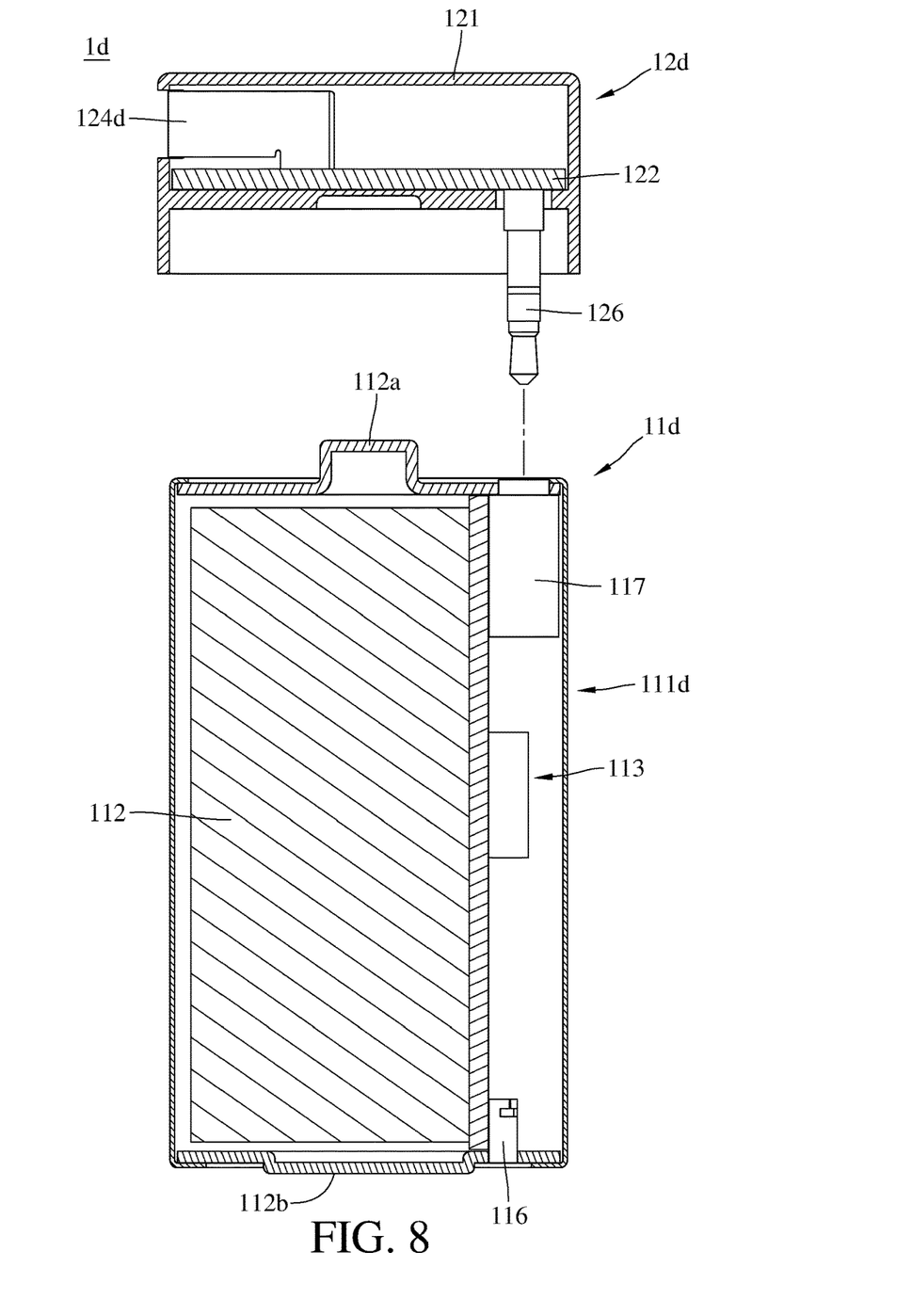
FIG. 8 is a cross-sectional view of the portable charger in FIG. 7.

Then, take a d-type battery as an example to illustrate the present disclosure, please refer to FIGS. 7-8, FIG. 7 is an exploded view of a portable charger according to a fourth embodiment of the present disclosure, and FIG. 8 is a cross-sectional view of the portable charger in FIG. 7.

This embodiment provides a portable charger 1d. The portable charger 1d includes a power supply 11d and an adapter 12d. The power supply 11d includes a first casing 111d, a battery module 112, a first connector 117 and a voltage control module 113. The first casing 111d is, for example, in a cylindrical shape. The battery module 112, the first connector 117 and the voltage control module 113 are all disposed in the first casing 111d. The battery module 112 and the first connector 117 both are electrically connected to the voltage control module 113, and the first connector 117 is electrically connected to a positive pole 112a and a negative pole 112b of the battery module 112.

The adapter 12d includes a second casing 121, a second connector 126 and an output connector 124d. The second connector 126 and the output connector 124d are disposed on the second casing 121, and the second connector 126 is electrically connected to the output connector 124d. The second casing 121 is detachably disposed on the first casing 111d. The second connector 126 is pluggable into the first connector 117 in order to switch control mode of the voltage control module 113.

In detail, the battery module 112 has an initial voltage which is, for example, 3.7 V. When the second connector 126 is unplugged from (electrically disconnected from) the first connector 117, the portable charger 1d is in a first state, and the voltage control module 113 adjusts the initial voltage (3.7V) to a first voltage (1.5V), allowing the portable charger 1d to supply electrical power through the first connector 117 with the first voltage (1.5V). When the second connector 126 is plugged into (electrically connected to) the first connector 117, the portable charger 1d is in a second state, and the voltage control module 113 adjusts the initial voltage (3.7V) to a second voltage (5V) which is different from the first voltage (1.5V), allowing the portable charger 1d to supply electrical power through the first connector 117 with the second voltage (5V).

In this embodiment, the first connector 117 is, for example, a female audio connector, and the second connector 126 is, for example, a male audio connector capable of being plugged into the first connector 117, but the present disclosure is not limited thereto. In some other embodiments, the first connector and the second connector may be other types of connectors.

According to the portable charger as discussed above, by detaching the adapter from the power supply or disposing the adapter on the power supply, the portable charger is able to switch to the first state or the second state to provide different output voltages. As a result, the portable charger is applicable to electronic devices having different voltage requirements.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A portable charger, comprising:
   a power supply, comprising a first casing, a battery module, a first terminal set, a voltage control module and a first switch portion, the battery module, the first terminal set, the voltage control module and the first switch portion being disposed in the first casing, and the battery module, the first terminal set and the first switch portion being electrically connected to the voltage control module; and
   an adapter, comprising a second casing, a second terminal set, an output connector and a second switch portion, the second terminal set, the output connector and the second switch portion being disposed in the second casing, the second terminal set being electrically connected to the output connector, the second casing being detachably disposed on the first casing, and the second switch portion and the first switch portion configured to switch control mode of the voltage control module;

wherein, the battery module has an initial voltage; when the second casing of the adapter is detached from the first casing of the power supply, and the first switch portion is not activated by the second switch portion, the portable charger is in a first state, and the voltage control module adjusts the initial voltage to a first voltage, allowing the first terminal set to output the first voltage; when the second casing of the adapter is disposed on the first casing of the power supply, the first switch portion is activated by the second switch portion, the portable charger is in a second state, and the voltage control module adjusts the initial voltage to a second voltage which is different from the first voltage, allowing the first terminal set to output the second voltage.

2. The portable charger according to claim 1, wherein the voltage control module comprises a first circuit board and a voltage converter, the first switch portion and the voltage converter are electrically connected to the first circuit board, and the voltage converter is configured to convert the initial voltage to the first voltage or the second voltage.

3. The portable charger according to claim 2, wherein the power supply comprises a charge port and the charge port is disposed on the first circuit board and exposed from the first casing.

4. The portable charger according to claim 3, wherein the charge port is a Micro-USB port.

5. The portable charger according to claim 3, wherein the charge port is a USB type-C port.

6. The portable charger according to claim 1, wherein the second casing of the adapter has a base portion and a side wall which are connected to each other, the base portion and the side wall together form a receiving space, and a portion of the power supply is located in the receiving space.

7. The portable charger according to claim 6, wherein the first terminal set of the power supply includes a first terminal and a second terminal, the second terminal set of the adapter includes a third terminal and a fourth terminal, the first terminal and the second terminal protrude from a same side of the first casing, the third terminal and the fourth terminal are disposed on the base portion and protrude a same side of the base portion; when the second casing of the adapter is disposed on the first casing of the power supply, the first terminal and the second terminal are respectively electrically connected to the third terminal and the fourth terminal.

8. The portable charger according to claim 1, wherein the first voltage is 9V and the second voltage is 5V.

9. The portable charger according to claim 1, wherein the power supply is a 9-volt battery.

10. The portable charger according to claim 1, wherein the output connector is a USB port, a lightning plug, a micro-USB plug or a USB plug.

11. The portable charger according to claim 1, wherein the first switch portion is a protrusion and the second switch portion is a push switch.

12. The portable charger according to claim 1, wherein the first switch portion is a light emitter and the second switch portion is a light receiver.

* * * * *